United States Patent [19]

Fisk

[11] Patent Number: 4,606,890
[45] Date of Patent: Aug. 19, 1986

[54] PROCESS FOR CONDITIONING METAL SURFACES

[75] Inventor: Peter R. Fisk, Bradford, England

[73] Assignee: Ciba-Geigy Corporation, Ardsley, N.Y.

[21] Appl. No.: 584,055

[22] Filed: Feb. 27, 1984

[30] Foreign Application Priority Data

Mar. 3, 1983 [GB] United Kingdom ............... 8305932
Jun. 20, 1983 [GB] United Kingdom ............... 8316670

[51] Int. Cl.$^4$ ............................................. C23F 11/16
[52] U.S. Cl. ........................................ 422/15; 210/696; 210/699; 252/180; 252/389.3; 422/17; 422/19; 204/148
[58] Field of Search ............................ 422/15, 17, 19; 210/696, 699; 252/8.55 E, 87, 180, 181, 389 A; 427/327; 204/148

[56] References Cited

U.S. PATENT DOCUMENTS 3,738,806  6/1973  Feiler ................................... 422/15
3,837,803  9/1974  Carter et al. ...................... 422/15 X
4,052,160 10/1977  Cook et al. ........................ 422/15
4,053,329 10/1977  Castellucci et al. ........... 427/327 X
4,351,796  9/1982  Marshall ............................ 422/15

Primary Examiner—Barry S. Richman
Assistant Examiner—William Ray Johnson
Attorney, Agent, or Firm—Harry Falber

[57] ABSTRACT

Process for conditioning metal surfaces to inhibit their corrosion and/or to inhibit scale deposition thereon by treating said surfaces:

(A) prior to contact with a corrosive or scaling environment, with 2-hydroxy-phosphonoacetic acid or a metal salt thereof and optionally with a metal ion component (b) as hereinafter defined (B) during contact with an aqueous system capable of corroding said metal surfaces or depositing scale thereon, with a combination of:

(a) 2-hydroxy-phosphonoacetic acid or a water-soluble salt thereof; and (b) a metal ion which enhances, synergistically, the metal conditioning effected, individually, by 2-hydroxy-phosphonoacetic acid and the metal ion.

16 Claims, No Drawings

PROCESS FOR CONDITIONING METAL SURFACES

The present invention relates to a process for conditioning metal surfaces to inhibit corrosion of the metal surfaces and/or deposition of scale thereon.

In GB No. 2 112 370 A, we have described and claimed a method of treating an aqueous system to inhibit corrosion of metals, especially ferrous metals, in contact therewith and/or to inhibit scale deposition from the aqueous system, comprising adding to the aqueous system from 0.1 to 50000 ppm of 2-hydroxy-phosphonoacetic acid having the formula I:

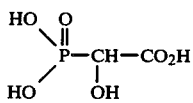

or a water-soluble salt thereof.

Suitable salts listed in GB No. 2 112 370 A are water-soluble salts or partial salts of e.g. an alkali metal, an alkaline earth metal, ammonia or a 1-20C alkylamine optionally substituted with one to six hydroxyl groups. Specific salts listed are lithium, sodium, potassium, calcium, strontium, magnesium, ammonia, methylamine, ethylamine, n-propylamine, trimethylamine, triethylamine, n-butylamine, n-hexylamine, octylamine, ethanolamine and triethanolamine.

Said salts are merely listed as alternatives to the free acid form of 2-hydroxy-phosphonoacetic acid: there is no suggestion that any synergistic effects could be obtained by employing specific metal ions in combination with 2-hydroxy-phosphonoacetic acid. Nor is there any suggestion in GB No. 2 112 370 A that 2-hydroxyphosphonoacetic acid could be employed to condition metal surfaces against corrosion prior to exposure to a corrosive or scaling environment.

We have now found that metal surfaces may be conditioned to inhibit their corrosion and/or to inhibit scale deposition thereon if the metal surfaces are treated, prior to contact with a corrosive/scaling system, with 2-hydroxy-phosphonoacetic acid or a water-soluble salt thereof and optionally a metal ion component.

Moreover, we have also found, surprisingly, that synergistic effects are obtained when metal surfaces liable to corrosion and/or scale deposition are treated during contact with an aqueous corrosive scaling system, with a combination of 2-hydroxy-phosphonoacetic acid and certain metal ions.

Accordingly, the present invention provides a process for conditioning metal surfaces, especially ferrous, or copper (or their alloys) surfaces, to inhibit their corrosion and/or to inhibit scale deposition thereon by:

(A) treating said surfaces, prior to contact with a corrosive or scaling environment, with 2-hydroxy-phosphonoacetic acid or a water-soluble salt thereof and optionally a metal ion component (b) as hereinafter defined; or (B) treating said surfaces, during contact with an aqueous system capable of corroding metal surface or depositing scale thereon, with a combination of:

(a) 2-hydroxy-phosphonoacetic acid or a water-soluble salt thereof and (b) a metal ion which enhances, synergistically, the metal conditioning effected, individually, by 2-hydroxy-phosphonoacetic acid and the metal ion.

Treatments (A) and (B) can advantageously be applied by cathodically polarising the metal surface to be treated e.g. by any of the conventional impressed current techniques, see e.g. Chapter 11 of "Corrosion", L. L. Schneir, Newnes-Butterworth, 1976.

With respect to the treatments effected under heading (A), the metal surface to be treated may be contacted with e.g. an aqueous solution of 2-hydroxy-phosphonoacetic acid (or a water-soluble salt thereof) optionally in combination with a metal ion component especially a metal ion (b) which imparts synergistic corrosion inhibiting and/or scale inhibiting effects in combination with 2-hydroxy-phosphonoacetic acid. Some typical applications of treatments (A) with the preferred application of impressed current techniques include temporary protection of metal surfaces to be exposed to corrosive atmospheres e.g. ambient atmospheres; pre-treatment of metal surfaces to be subsequently painted; co-treatment in order to seal a phosphated metal surface; and formulating a paint containing 2-hydroxyphosphonoacetic acid (or a salt thereof) and optionally metal ion component (b) and then applying this paint on to the metal surface to be conditioned by e.g. spraying, brushing, dipping or cathodically electro-depositing.

In each of these typical applications of treatments of type A, the metal surface e.g. a phosphated mild steel surface may be immersed in a solution of 2-hydroxy-phosphonoacetic acid (or a water-soluble salt thereof), optionally containing a metal ion component (b), as hereinbefore defined, or said solution may be painted or sprayed on to the said phosphated metal surface.

With respect to sealing of phosphated metal surfaces, it is common practice to phosphate the surface of metal articles to form a bonding or keying layer for protective or decorative paint finishes on the metal articles and to minimise subsequent corrosion under the finish. The term phosphating is applied to the treatment of the metal surface in solutions which form a coating consisting mainly of metal phosphates. Such coatings, while forming a good key for the paint finish, are generally not entirely satisfactory in inhibiting subsequent corrosion due to the porosity of the phosphate coating. It is therefore customary to improve said corrosion inhibition by sealing the phosphate coating, traditionally by immersion in an aqueous chromate solution. However, the use of chromate solutions presents toxicity and effluent problems and therefore, there is a need to find new sealing techniques which avoid the disadvantages associated with chromate sealing. We have found that the application of a type A conditioning according to the invention provides effective phosphate sealing, optionally in combination with cathodising the phosphated metal surface, and avoids the problems associated with conventional chromate treatments.

In relation to the electropainting technique, the initial coating of paint or polymer applied to the surface of metal articles, either directly on to the metal surface or after phosphating, is commonly an electropaint. Electropaints are coating compositions, emulsified or solubilised in water. These compositions can be caused to be deposited on to a metal surface by polarising said metal surface, either anodically or cathodically relative to another electrode, according to the type of paint used. When a cathodically applied electropaint is deposited, the corrosion resistance of the coated metal may be enhanced by simultaneously conditioning the metal surface, or sealing the phosphate coating, according to the type A embodiment of the present invention, by incorporating 2-hydroxyphosphonoacetic acid (or a water-soluble salt thereof) optionally in combination with a synergistic metal ion (b), into the electropaint composition.

In treatment according to the invention under heading A or B, the metal ion component may be used as an independent metal salt or as the pre-formed salt of the compound of formula I, or a combination of the two.

Suitable metal ion components (b) include, e.g. cobalt, ferrous, barium, calcium, zinc, chromium, nickel, strontium, manganous, cadmium, ceric and magnesium ions. Some of these metal ions e.g. calcium and barium per se do not impart any corrosion inhibition.

While some of these metal ion components (b) overlap with metal salts listed in GB No. 2 112 370 A others such as cobalt, ferrous and barium ions, which provide very effective synergistic combinations with the compound of formula I, while generally embraced, are not specifically disclosed in GB No. 2 112 370 A.

Moreover, GB No. 2 112 370 A does not suggest that the use of the compound of formula I, in the form of a water-soluble salt, could lead to enhanced results over and above the results to be obtained using the free acidic form of the compound of formula I.

2-Hydroxy-phosphonoacetic acid is a known compound having been described in U.S. Pat. No. 3,032,500 and, more recently in European Patent Application No. 0027199. It can be prepared by known methods e.g. by reacting orthophosphorous acid, a salt or a solution thereof, or phosphorous trichloride (or $PCl_3$/water mixtures) with glyoxylic acid, a salt or a solution thereof.

The ratio of 2-hydroxy-phosphonoacetic acid (or water-soluble salt thereof) to metal ion component (b), used in the corrosion- and/or scale-inhibiting combinations employed in the conditioning processes of invention, may vary within wide limits e.g. from 100:1 to 1:100, more preferably from 10:1 to 1:10 parts by weight.

In practice, the amount of the combination of 2-hydroxy-phosphonoacetic acid and metal ion which is used to treat the metal surface e.g. by adding the combination to the aqueous system in contact with the metal surface will vary depending upon the protective function which the combination is required to perform. For corrosion-inhibiting protective treatments, optionally in combination with scale inhibiting treatments, the amount of said combination added to the aqueous system is conveniently within the range of from 0.1 to 50,000 ppm (or 0.00001 to 5% by weight) preferably from 1 to 500 ppm (or 0.0001 to 0.05% by weight) based on aqueous system. For solely anti-scale purposes, the amount of said combination used is conveniently from 1 to 200 ppm, preferably 1 to 30 ppm, based on the aqueous system.

With respect to aqueous systems from which a metal surface may be conditioned according to the present invention, of particular interest with respect to combined corrosion inhibition and anti-scale treatments are cooling water systems, steam generating systems, seawater evaporators, hydrostatic cookers, gas scrubbing systems, closed circuit heating systems, aqueous-based refrigeration systems and oil field applications; for corrosion inhibition treatments alone, aqueous systems of particular interest include aqueous machining fluid formulations (e.g. for use in boring, milling, reaming, broaching, drawing, spinning, turning, cutting, sawing, grinding, and thread-cutting operations or in non-cutting shaping in drawing or rolling operations), aqueous scouring systems, engine coolants including aqueous glycol antifreeze systems, water/glycol hydraulic fluids; and aqueous based polymer surface-coating systems.

In the particular case of the inhibition of scale and corrosion in oil field applications, special problems are presented which are not encountered in more conventional water treatment applications. Thus, formation water, associated with oil-bearing strata, often contains barium and strontium as well as ions such as calcium, magnesium, carbonate and bicarbonate ions which are more commonly found in surface waters and sea water. Therefore, in situations in which surface or sea water becomes mixed with formation water, severe scaling can occur due to the precipitation of barium sulphate, strontium sulphate, calcium carbonate and mixtures thereof. This type of scaling occurs e.g. during cooling-/depressurisation of recovered crude oil/water emulsions in the rock formation in the well base and in the well bore when water is pumped into the formation to "squeeze" a well. This type of scale formation can be effectively inhibited by the conditioning technique according to the present invention.

In addition to inhibiting the deposition of conventional scale on to metal surfaces, the conditioning process of the present invention is also useful in inhibiting deposition of calcium—or magnesium silicate scales.

The synergistic inhibitor combination may be used alone or in conjunction with other compounds known to be useful in the treatment of aqueous systems.

Wholly aqueous systems from which the process of the present invention may be applied, including cooling water systems, air-conditioning systems, steam-generating systems, sea-water evaporator systems, hydrostatic cookers, and closed circuit heating or refrigerant systems, further corrosion inhibitors may be used such as, for example, water soluble zinc salts; phosphates; polyphosphates; phosphonic acids and their salts, for example, acetodiphosphonic acid, nitrilotris methylene phosphonic acid and methylamine dimethylene phosphonic acid; other phosphonocarboxylic acids and their salts, for example, those described in German Offenlegungsschrift No. 2632774, 2-phosphonobutane-1,2,4-tricarboxylic acid and those disclosed in GB No. 1572406; chromates for example, sodium chromate; nitrates, for example sodium nitrate; nitrites e.g. sodium nitrite; molybdates e.g. sodium molybdate; silicates e.g. sodium silicate; benzotriazole, 5,5-methylene-bis-benzotriazole or copper deactivating benzotriazole or tolutriazole derivatives; N-acyl sarcosines; N-acylimino diacetic acids; ethanolamines; fatty amines; and polycarboxylic acids, for example, polymaleic acid and polyacrylic acid, as well as their respective alkali metal salts, copolymers of maleic anhydride, copolymers of acrylic acid, and substituted derivatives of polymaleic and polyacrylic acids and their copolymers.

Moreover, in such completely aqeous systems, the synergistic inhibitor combination may be used in conjunction with further dispersing and/or threshold agents, e.g. polymerised acrylic acid (or its salts), phosphino-polycarboxylic acids (as described and claimed in British Pat. No. 1458235), hydrolysed polyacrylonitrile, polymerised methacrylic acid and its salts, polyacrylamide and copolymers thereof from acrylic and methacrylic acids, lignin sulphonic acid and its salts, tannin, naphthalene sulphonic acid/formaldehyde condensation products, starch and its derivatives, cellulose, acrylic acid/lower alkyl hydroxyacrylate copolymers such as those described in U.S. Pat. No. 4,029,577, sulphonated styrene/maleic anhydride copolymers, styrene/maleic anhydride copolymers and sulphonated styrene homopolymers such as those described in the U.S. Pat. No. 4,374,733 and combinations thereof. Specific threshold agents, such as for example, 2-phosphonobutane-1,2,4-tricarboxylic acid, acetodiphosphonic acid, hydrolysed polymaleic anhydride and its salts, alkyl phosphonic acids, 1-aminoalkyl-1,1-diphosphonic acids and their salts, and alkali metal polyphosphates, may also be used.

Precipitating agents such as alkali metal orthophosphates, carbonates; oxygen scavengers such as alkali metal sulphites and hydrazines; sequestering agents such as nitrilotriacetic acid and its salts; antifoaming agents such as silicones e.g. polydimethylsiloxanes, distearylsebacamide, distearyl adipamide and related products derived from ethylene oxide and/or propylene oxide condensations, in addition to fatty alcohols, such as capryl alcohols and their ethylene oxide condensates; and biocides e.g. amines, quaternary ammonium compounds, chlorophenols, sulphur-containing compounds such as sulphones, methylene bis thiocyanates and carbamates, isothiazolones, brominated propionamides, triazines, phosphonium compounds, chlorine and chlorine-release agents and organometallic compounds such as tributyl tin oxide, may be used.

If the metal to be conditioned by the method of the invention is treated from a system which is not completely aqueous e.g. an aqueous machining fluid formulation, it may be e.g. a water dilutable cutting or grinding fluid.

The aqueous machining fluid formulations of the invention may be e.g. metal working formulations. By "metal working" we mean "reaming, broaching, drawing, spinning, cutting, grinding, boring, milling, turning, sawing, non-cutting shaping or rolling". Examples of water-dilutable cutting or grinding fluids into which the corrosion inhibiting combination may be incorporated include:

(a) Aqueous concentrates of one or more corrosion inhibitors, and optionally one or more anti-wear additives, used at dilutions of 1:50 to 1:100, which are usually employed as grinding fluids;

(b) Polyglycols containing biocides, corrosion inhibitors and anti-wear additives which are used at dilutions of 1:20 to 1:40 for cutting operations and 1:60 to 1:80 for grinding;

(c) Semi-synthetic cutting fluids similar to (b) but containing in addition 10 to 25% oil with sufficient emulsifier to render the water diluted product translucent;

(d) An emulsifiable mineral oil concentrate containing, for example, emulsifiers, corrosion inhibitors, extreme pressure/anti-wear additives, biocides, antifoaming agents, coupling agents etc; they are generally diluted from 1:10 to 1:50 with water to a white opaque emulsion;

(e) A product similar to (d) containing less oil and more emulsifier which on dilution to the range 1:50 to 1:100 gives a translucent emulsion for cutting or grinding operations.

For those partly-aqueous systems in which the aqueous system component is an aqueous machining fluid formulation the synergistic inhibitor combination may be used singly, or in admixture with other additives e.g. known further corrosion inhibitors and/or extreme-pressure additives.

Examples of other corrosion inhibitors which may be used in these aqueous systems, in addition to the inhibitor combination used according to the invention include the following groups:

(a) Organic acids, their esters or ammonium, amine, alkanolamine and metal salts, for example, benzoic acid, p-tert-butyl benzoic acid, disodium sebacate, triethanolamine laurate, iso-nonanoic acid, triethanolamine salt of p-toluene sulphonamido caproic acid, sodium N-lauroyl sarcosinate or nonyl phenoxy acetic acid;

(b) Nitrogen-containing materials such as the following types: fatty acid alkanolamides; imidazolines, for example, 1-hydroxy-ethyl-2-oleyl-imidazolines; oxazolines; triazoles, for example, benzotriazoles; triethanolamines; fatty amines; and inorganic salts, for example, sodium nitrate.

(c) Phosphorous containing materials such as the following types: amine phosphates, phosphonic acids or inorganic salts, for example, sodium dihydrogen phosphate or zinc phosphate;

(d) Sulphur containing compounds such as the following types: sodium, calcium or barium petroleum sulphonates, or heterocyclics, for example, sodium mercaptobenzothiazole.

Nitrogen containing materials, particularly triethanolamine, are preferred.

Examples of extreme pressure additives which may be present in the systems treated according to the present invention include sulphur and/or phosphorous and/or halogen containing materials, for instance, sulphurised sperm oil, sulphurised fats, tritolyl phosphate, chlorinated paraffins or ethoxylated phosphate esters.

When triethanolamine is present in the aqueous systems treated according to the present invention, it is preferably present in an amount such that the ratio of synergistic inhibitor combination to triethanolamine is from 2:1 to 1:20.

The partly-aqueous systems from which the process of the present invention may be applied may also be aqueous surface-coating compositions e.g. emulsion paints and aqueous powder coatings for matallic substrates.

The aqueous surface-coating composition may be e.g. a paint such as a styrene-acrylic copolymer emulsion paint, a resin, latex, or other aqueous based polymer surface-coating systems, used to coat a metal substrate. The inhibitor combination according to the present invention may be used to prevent flash rusting of the metal substrate during application of the surface coating and to prevent subsequent corrosion during use of the coated metal.

In aqueous surface-coating compositions treated by the method of the invention the inhibitor combination may be used singly, or in admixture with other additives e.g. known corrosion inhibitors, biocides, emulsifiers and/or pigments.

The further known corrosion inhibitors which may be used are e.g. those of classes (a), (b), (c) and (d) hereinbefore defined.

Examples of biocides which may be used in the aqueous systems treated according to the present invention include the following:

Phenols, and alkyl- and halogenated phenols, for example pentachlorophenol, o-phenylphenol, o-phenoxyphenol and chlorinated o-phenoxyphenol, and salicylanilides, diamines, triazines and organometallic compounds such as organomercury compounds and organotin compounds.

Examples of pigments which may be used in the aqueous systems treated according to the present invention include titanium dioxide, zinc chromate, iron oxide and organic pigments such as the phthalocyanines.

The following examples further illustrate the present invention.

The 2-hydroxy-phosphonoacetic acid active ingredient used in the following use Examples 2 to 24 is prepared as follows:

EXAMPLE 1

(A) 16.3 parts (0.11 mole) 50% aqueous glyoxylic acid and 8.2 parts (0.1 mole) orthophosphorous acid are heated together with stirring at 98°–100° C. for 24 hours to give 24.5 parts of 60% aqueous 2-hydroxyphosphonoacetic acid.

(B) 150 parts of a 60% aqueous solution of 2-hydroxyphosphonoacetic acid obtained according to Example 1A is evaporated under reduced pressure (20 millibars) to give 104 parts of a viscous brown oil. This oil is induced to crystallise. The crude crystalline mass is then triturated with acetone to remove impurities. The resulting buff colored crystalline 2-hydroxyphosphonoacetic acid is removed by filtration, washed with acetone, and dried.

The crude crystalline 2-hydroxyphosphonoacetic acid so obtained is then recrystallised from water to give pure 2-hydroxyphosphonocetic acid as white crystals m.p. 165°–167.5° C.

$^{31}$P-NMR: $\delta = -14$ ppm (relative to external $H_3PO_4$):
$^1$H-NMR: P-CH $\delta = 4.24$ ppm. $J_{P-CH} = 18$ Hz.
IR: COOH: $17\overline{45}$ cm$^{-1}$; P=O: 1200 cm$^{-1}$.

EXAMPLES 2 TO 12

Corrosion inhibitor activity of the active inhibitor combination is demonstrated in the following way:

Mild steel coupons, 5 cms. × 2.5 cms. are scrubbed with pumice, immersed for one minute in hydrochloric acid and then rinsed, dried and weighed.

The desired proportion of additive combination is dissolved in 200 ml of deionised water. The metal ions are added as their chlorides and all test solutions are adjusted to pH 7 with sodium hydroxide. A steel coupon prepared as above is suspended in the solution, and the whole is stored in a closed bottle in a thermostat at 40° C. During the storage period, air is passed into the solution at 500 ml/minute, the passage of the air being screened from the steel coupon; any water losses by evaporation are replaced with deionized water. After 48 hours, the steel coupons are removed, scrubbed without pumice, immersed for one minute in hydrochloric acid inhibited with 1% by weight of hexamine and then rinsed, dried and reweighed. A certain loss in weight will have occurred.

The results obtained in a series of tests using 100 ppm each of 2-hydroxyphosphonoacetic acid and various metal ions are set out in Table 1, in which m,d,d, denotes milligrams weight loss/sq. decimeter/day:

TABLE 1

| Example | Metal ion | Corrosion (m,d,d,) |
|---------|-----------|--------------------|
| Control | Sodium | 140 |

TABLE 1-continued

| Example | Metal ion | Corrosion (m,d,d,) |
|---------|-----------|--------------------|
| Control | Potassium | 124 |
| 2 | Calcium | 1.0 |
| 3 | Zinc | 1.6 |
| 4 | Cadmium | 2.0 |
| 5 | Manganous | 2.0 |
| 6 | Cobaltous | 2.2 |
| 7 | Nickel | 2.4 |
| 8 | Strontium | 2.8 |
| 9 | Barium | 6.8 |
| 10 | Magnesium | 7.8 |
| 11 | Lithium | 78 |
| 12 | Titanium | 84 |

When the above metals ions are used in the above tests method in the absence of 2-hydroxyphosphonoacetic acid, the corrosion values (mdd) obtained are each of the order 80–120.

EXAMPLES 13 TO 22

The synergistic effect of combinations of 2-hydroxyphosphonoacetic acid and metal ions, used according to the invention, is assessed by determining the reduction of cathodic current of a metal surface conditioned with said combination. In order to effect this assessment, the final steady state current of the conditioned metal surface is measured in air-saturated water.

A mild steel rotating disc electrode, rotating at 4 Hz, is held at −800 mV (relative to a standard calomel electrode) in the test solution and the final steady state current is recorded using a conventional three-electrode potentiostatic circuit.

The test solutions used contain 0.1M sodium per chlorate as background electrolyte and either:

(a) 100 ppm of 2-hydroxyphosphonacetic acid prepared as in Example 1; or (b) 100 ppm of 2-hydroxyphosphonoacetic acid (HPAA) and 100 ppm of a metal ion component (as its chloride).

The results in the following Table II clearly show the reduction in the current passed at −800 mV when using 2-hydroxy-phosphonoacetic acid in combination with a metal ion, relative to the use of 2-hydroxy-phosphonoacetic acid alone.

TABLE II

| Example | Inhibitor | Metal Ion | Cathodic Current ($\mu$Acm$^{-2}$) |
|---------|-----------|-----------|-----------------------|
| | 100 ppm | 100 ppm | |
| | None | None | 500 |
| | HPAA | None | 420 |
| — | — | Ferrous | 318 |
| 13 | HPAA | Ferrous | 29 |
| — | — | Barium | 487 |
| 14 | HPAA | Barium | 31 |
| — | — | Calcium | 440 |
| — | HPAA | Calcium | 52 |
| 16 | HPAA | Chromic | 60 |
| — | — | Strontium | 453 |
| 17 | HPAA | Strontium | 99 |
| — | — | Chromous | 474 |
| 18 | HPAA | Chromous | 101 |
| 19 | HPAA | Manganous | 114 |
| 20 | HPAA | Cadmium | 200 |
| 21 | HPAA | Cerium | 270 |
| 22 | HPAA | Magnesium | 371 |

This decrease in current passed is indicative of:

(i) A decrease in the rate of oxygen reduction at the metal surface with the consequent anticipation that there will be a degree of correlation between these data and the corrosion inhibition data of Example 2 relating to freely corroding metal coupons. This correlation will not be complete, however, because the potential of −800 mV applied in the test of Examples 13 to 22 suppresses the effect of anodic processes;

(ii) A decrease in the current required to prevent corrosion by the use of an impressed cathodic current; and (iii) The conditioning of the treated metal surface by cathodic polarisation in solutions of HPAA and HPAA combined and synergistic metal ions.

EXAMPLE 23

A mild steel coupon (2.5 cm×5 cm) is immersed in a solution containing 100 ppm HPAA and 100 ppm $Ca^{++}$ and a cathodic current is 50 $\mu Acm^{-2}$ is passed through the coupon for 22 hours. The coupon is then removed from the solution, washed with distilled water and dried.

The coupon so conditioned, together with similar, clean untreated coupons, are suspended near the top of a 2 liter beaker containing 200 ml of deionised water, the atmosphere of which is held at 100% relative humidity and at 40° C. by means of a hot plate placed below the beaker and a cooling coil arranged around the top half of the beaker. Vapour condenses on each of the suspended coupons and causes their corrosion. After 24 hours exposure, the surface of the untreated coupons is covered with spots (0.5 mm) of rust. The coupon pre-conditioned according to the process of the invention is free of rust spots toan extent of 80%. The remaining 20% of the surface of the pre-conditioned coupon is evenly corroded but to a less deep extent that the control coupons.

EXAMPLE 24

Scale formation on metal surfaces can initiate at cathodic corrosion sites. Therefore an accelerated test to demonstrate the effectiveness of 2-hydroxy-phosphonoacetic acid for preventing scale formation from water containing barium, strontium and sulphate ions is carried out by cathodically polarising a mild steel specimen in the scaling water. The specimen is held at −800 mV with respect to a standard calomel electrode and the change in current and change in visual appearance is monitored with respect to time. The test solution is used at 40° C. and consisted of equal parts of filtered sea water and a solution in deionised water of the following salts:

|  | g/l |
| --- | --- |
| Calcium chloride 6 H$_2$O | 17.5 |
| Magnesium chloride 6 H$_2$O | 5.0 |
| Barium chloride 2 H$_2$O | 0.5 |
| Strontium nitrate | 1.6 |
| Sodium chloride | 77 |
| Potassium chloride | 2 |
| Sodium carbonate | 0.5 |

During a 15 minute test period, the metal specimen become coated with a white scale of barium and strontium sulphate and the cathodic current passed by the specimen drops due to the formation of the scale layer.

A similar experiment is carried out except for the addition of 15 parts per million of 2-hydroxy-phosphonoacetic acid to the test solution. The current passed by the specimen again drops due to the conditioning of the metal surface according to the process of the invention, but the surface remains completely free from scale.

EXAMPLE 25

A 20% w/v solution of calcium chloride in water is used in the aerated solution bottle test (as described in Example 2). This is a typical composition of solutions used in aqueous-based refrigeration systems. In this example the fluid itself is the source of metal cations required in the inhibitor combination used according to the present invention.

The corrosion rates obtained are

| Conc HPAA/ppm | Corrosion Rate/mdd |
| --- | --- |
| 0 | 120 |
| 50 | 24 |
| 100 | 21 |
| 200 | 17 |

What is claimed is:

1. A process for conditioning metal surfaces so as to inhibit corrosion thereon by treating said surfaces during contact with an aqueous system capable of corroding said metal surfaces, with a combination of an effective protective amount of (a) 2-hydroxy-phosphonoacetic acid or a water-soluble salt thereof; and (b) a metal ion which enhances, synergistically, the metal conditioning effected, individually, by 2-hydroxyphosphonoacetic acid or water-soluble salt thereof and the metal ion, wherein said metal ion consists of at least one of ferrous, barium, calcium, zinc, chromium, strontium or cadmium ions.

2. Process according to claim 1 wherein said metal surface comprises a ferrous, copper, ferrous alloy or copper alloy surface.

3. Process according to claim 1 wherein said metal surface to be treated is cathodically polarised.

4. A process according to claim 1, wherein the aqueous system comprises a cooling water system, a steam generating system, a sea water evaporator, a hydrostatic cooker, a gas scrubbing system, a closed circuit heating system, an aqueous-based refrigeration system or an oil field system.

5. A process according to claim 1 wherein the inhibitor combination is added in an amount of 1 to 500 ppm.

6. A process according to claim 5 wherein the inhibitor combination is added in an amount of 1 to 100 ppm.

7. A process according to claim 1 wherein the aqueous system comprises an aqueous machining fluid formulation, an aqueous scouring system, an aqueous glycol antifreeze system, a water/glycol hydraulic fluid or a water-based surface coating composition.

8. A process according to claim 7 wherein the aqueous machining fluid formulation is a water-dilutable cutting- or grinding fluid.

9. Process according to claim 1 wherein the ratio of 2-hydroxyphosphonoacetic acid or water-soluble salt thereof to said metal ion component is within the range of 100:1 to 1:100.

10. Process according to claim 9 wherein the ratio of 2-hydroxyphosphonoacetic acid or water-soluble salt thereof to said metal ion component is from 10:1 to 1:10.

11. A process according to claim 1 wherein the inhibitor further comprises the addition of another compound which is known to be useful in corrosion inhibition of aqueous systems.

12. A process according to claim 11 wherein the aqueous system comprises a cooling water system, an air conditioning system, a steam generating system, a sea water evaporator, a hydrostatic cooker, a gas scrubbing system or a closed circuit heating or refrigerant system and wherein the inhibitor combination further includes at least one of a further corrosion inhibitor, a dispersing agent, a threshold agent, a precipitating agent, an oxygen scavenger, a sequestering agent and an anti-foaming agent and a biocide.

13. A process according to claim 11 wherein the aqueous system comprises an aqueous surface coating composition and the inhibitor combination further includes at least one of a further corrosion inhibitor, a biocide, an emulsifier and a pigment.

14. A process according to claim 11 wherein the aqueous system comprises an aqueous machining fluid and the inhibitor combination further includes at least one of a further corrosion inhibitor and an extreme pressure additive.

15. A process according to claim 14 wherein the further corrosion inhibitor is triethanolamine.

16. A process according to claim 15 wherein triethanolamine is present in an amount such that the ratio of inhibitor combination (a) and (b) to triethanolamine is from 2:1 to 1:20.

* * * * *